(12) United States Patent
Vanni

(10) Patent No.: US 10,520,072 B2
(45) Date of Patent: Dec. 31, 2019

(54) PASSIVE VARIABLE-PITCH STATOR FOR TORQUE CONVERTER

(71) Applicant: SCHAEFFLER TECHNOLOGIES AG & CO. KG, Herzogenaurach (DE)

(72) Inventor: Jeremy Vanni, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 3 days.

(21) Appl. No.: 15/979,984

(22) Filed: May 15, 2018

(65) Prior Publication Data

US 2019/0353234 A1 Nov. 21, 2019

(51) Int. Cl.
*F16H 61/56* (2006.01)
*F16H 41/28* (2006.01)
*F16H 61/54* (2006.01)

(52) U.S. Cl.
CPC ............ *F16H 41/28* (2013.01); *F16H 61/54* (2013.01); *F16H 61/56* (2013.01); *F16H 2041/285* (2013.01)

(58) Field of Classification Search
CPC .... F16H 41/28; F16H 2041/285; F16H 61/54; F16H 61/56
USPC .................................... 60/342, 349
See application file for complete search history.

(56) References Cited

U.S. PATENT DOCUMENTS

| | | | |
|---|---|---|---|
| 2,909,034 A | 10/1959 | Jandasek | |
| 2,924,941 A | 2/1960 | Snoy | |
| 2,944,402 A * | 7/1960 | Russell | F16H 61/56 60/354 |
| 2,944,441 A | 7/1960 | Russell | |
| 2,999,400 A * | 9/1961 | Kelley | F16H 61/56 60/342 |
| 3,852,955 A * | 12/1974 | Wonn | F16H 41/26 60/354 |
| 3,934,414 A * | 1/1976 | Merkle | F16H 61/56 60/342 |
| 3,986,356 A | 10/1976 | Frötschner et al. | |
| 4,009,571 A | 3/1977 | Black et al. | |
| 4,108,290 A | 8/1978 | Fisher | |
| 4,128,999 A | 12/1978 | Yokoyama et al. | |
| 4,180,977 A * | 1/1980 | Beardmore | F16H 41/26 60/342 |
| 4,377,068 A | 3/1983 | Braatz | |
| 4,848,084 A | 7/1989 | Wirtz | |
| 5,263,319 A | 11/1993 | By et al. | |
| 5,307,629 A * | 5/1994 | By | F16H 41/26 60/342 |
| 9,784,353 B2 * | 10/2017 | Frait | F16H 45/02 |
| 2011/0132709 A1 | 6/2011 | Fukunaga et al. | |
| 2016/0047469 A1 | 2/2016 | LaVoie et al. | |
| 2016/0116044 A1 | 4/2016 | Frait et al. | |
| 2017/0130812 A1 | 5/2017 | Maurer et al. | |
| 2017/0276244 A1 | 9/2017 | Stützinger et al. | |

FOREIGN PATENT DOCUMENTS

JP 63062965 A 3/1988

* cited by examiner

*Primary Examiner* — Michael Leslie
(74) *Attorney, Agent, or Firm* — Brooks Kushman, P.C.

(57) ABSTRACT

A torque converter includes an impeller, a turbine axially movable relative to the impeller, and a variable-pitch stator. The stator includes a hub and variable-pitch blades circumferentially arranged on the hub. Each of the blades are rotatable between first and second positions in response to axial movement of the turbine.

20 Claims, 2 Drawing Sheets

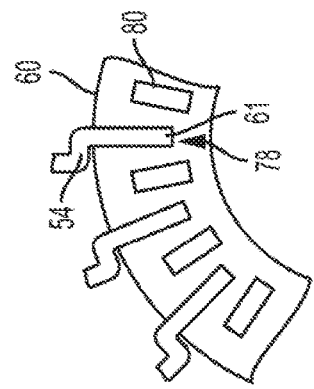
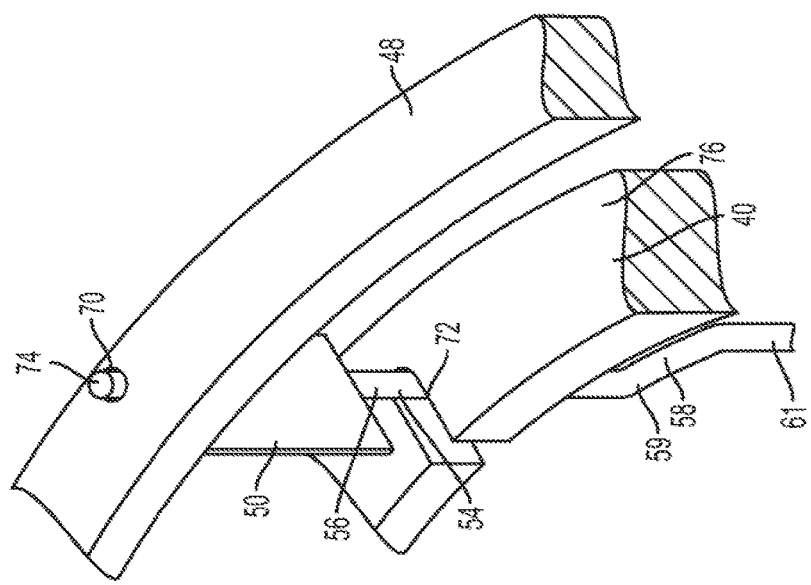

PASSIVE VARIABLE-PITCH STATOR FOR TORQUE CONVERTER

TECHNICAL FIELD

The present disclosure relates to torque converters and more particularly to torque converters having variable-pitch stators.

BACKGROUND

Automatic transmissions may include a torque converter for coupling a transmission input shaft to a crankshaft of an engine. The torque converter includes an impeller fixed to the crankshaft, a turbine fixed to the input shaft, and a stator disposed between the impeller and the turbine. The torque converter may also include a bypass clutch that mechanically couples the transmission input shaft to the case of the torque converter, which is fixed to the crankshaft. The bypass clutch may include one or more clutch plates that rotate with the case and are interleaved with one or more disks that rotate with the input shaft. To engage the clutch, pressurized fluid forces a piston to compress the clutch plates.

The stator redirects fluid returning from the turbine so that the fluid is rotating in the same direction as the impeller. Some stators have variable-pitch blades that are controllable to alter the flow of fluid from the turbine to the impeller to tighten or loosen the torque converter.

SUMMARY

According to one embodiment, a torque converter includes an impeller, a turbine axially movable relative to the impeller, and a variable-pitch stator. The stator includes a hub and variable-pitch blades circumferentially arranged on the hub. Each of the blades are rotatable between first and second positions in response to axial movement of the turbine.

According to another embodiment, a torque converter includes an impeller, a turbine axially movable relative to the impeller, and a stator. The stator includes a hub, variable-pitch blades circumferentially arranged on the hub and each having a crank rotatable to rotate the blade between first and second positions, and a piston plate disposed between the turbine and the cranks and engageable with the cranks. A resilient member is disposed in the hub and engages the cranks to bias the blades to the first position. The stator is configured such that each of the blades rotates towards the second position in response to the turbine exerting a force on the piston in excess of a spring force of the resilient member.

According to yet another embodiment, a torque converter includes an impeller, a turbine axially movable relative to the impeller, and a stator. The stator has variable-pitch blades and a piston engageable with the blades to modify a pitch angle of the blades. A resilient member of the stator biasing each of the blades to a first position. The stator is configured such that each of the blades moves towards a second position in response to the turbine exerting a threshold force on the piston.

BRIEF DESCRIPTION OF THE DRAWINGS

FIG. 2 illustrates a partial perspective view of a stator of the torque converter, according to one embodiment.

FIG. 3 illustrates a partial front view of a locator ring and blade cranks of the stator, according to one embodiment.

DETAILED DESCRIPTION

Figure 1:
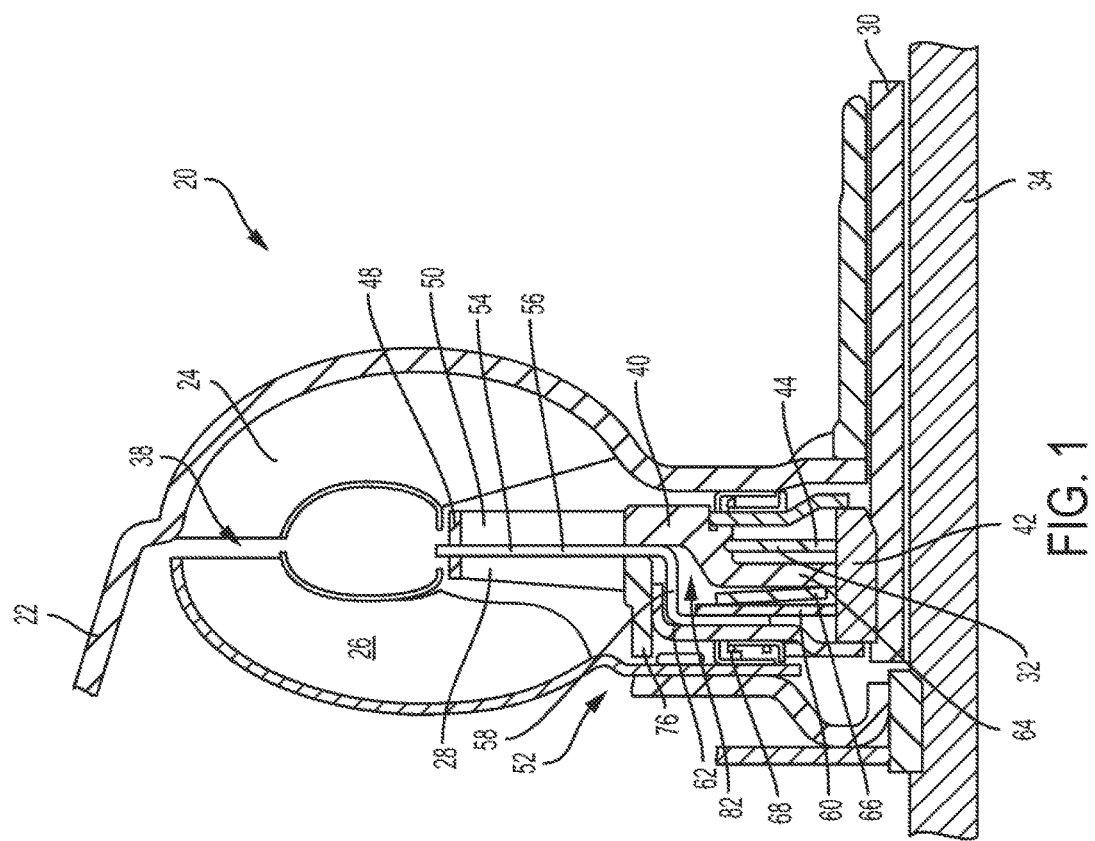
FIG. 1 illustrates a cross-sectional side view of a torque converter, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, many motor vehicles include an automatic transmission coupled to a powerplant, e.g., an engine, by a torque converter 20. The torque converter 20 includes a case 22 that is fixed to a crankshaft of the engine. An impeller 24 is fixed to the case 22 and rotates with the crankshaft. A turbine 26 is disposed adjacent to the impeller 24 within a hydrodynamic chamber 38 of the torque converter 20 and is connected to a turbine shaft 34 that supplies power to the transmission. A spline connection may be used so that the turbine 26 is rotationally fixed to the turbine shaft 34, but is axially movable. A torsional damper may be interposed between turbine 26 and the turbine shaft 34 to isolate the transmission and other driveline components from engine vibrations.

A stator 28 is coupled to a stator shaft 30 by a one-way clutch 32. The stator shaft 30 is fixed to a front support of the transmission and is stationary relative to the torque converter 20. When the turbine shaft 34 is stationary or rotating slowly compared to the crankshaft, the one-way clutch 32 holds the stator 28 stationary. Rotation of the impeller 24 forces fluid to move between the impeller 24, the turbine 26, and the stator 28. The fluid exerts a hydrodynamic torque on the turbine 26. The stator 28 provides a reaction force such that the torque on the turbine 26 can be greater than the torque on the impeller 24. When the speed of the turbine 26 approaches that of the impeller 24, fluid tends to flow around the centerline of the torque converter, causing the one-way clutch 32 to overrun.

The one-way clutch 32 is disposed within a hub (outer race) 40 of the stator 28. The clutch 32 may include an inner race 42 that is connected, e.g. splined, to the stator shaft 30 and a clutch element 44 that selectively locks the hub 40 to the inner race 42 in one direction. The stator 28 further includes an outer ring 48 and a plurality of blades 50 that are circumferentially arranged between the hub 40 and the outer ring 48.

Power flow through the hydrodynamic power flow path is governed by the speed of the impeller 24 and the speed of the turbine 26. The relationship between the speeds and the torques is a function of torus geometry and blade angles of the impeller 24, turbine 26 and stator 28. At a constant turbine speed, both the impeller torque and the turbine torque increase as impeller speed increases. A torque converter designed to exert a higher resistance torque on the impeller at a given impeller and turbine speed is called a stiffer or tighter torque converter, whereas a torque converter designed to exert a lower torque for the same impeller and turbine speed is called a looser torque converter. The tightness of a torque converter may be expressed as a K-factor that relates the impeller torque to the impeller speed. A low K-factor indicates a tight converter while a high K-factor indicates a loose converter. The ratio of the turbine torque to impeller torque generally increases as the ratio of impeller speed to turbine speed increases. The product of the speed ratio and the torque ratio is the converter efficiency, which varies between zero and one as a function of impeller speed and turbine speed.

A loose torque converter is desirable when the vehicle is stopped as it reduces load on the engine improving fuel economy. A loose torque converter may also be desirable for turbocharged engines as it allows the turbochargers to spool up more quickly. Once the vehicle begins moving, a tighter torque converter may be desirable to reduce engine speeds. Thus, it is desirable to have a torque converter in which the K-factor may be adjusted to optimize torque converter operation in these different operating conditions. The K-factor may be adjusted by modifying a pitch angle of the blades 50 of the stator 28. Generally, the torque converter becomes looser by closing the blades of the stator and becomes tighter by opening the blades of the stator.

Each of the blades 50 are rotatable to modify the pitch angle of the blades between an open position, a closed position, and a range of intermediate positions. The open position corresponds to a tightest condition of the torque converter 20 and the closed position corresponds to a loosest condition. In most designs, the blades are not designed to fully open, i.e., parallel to the axial centerline of the torque converter, or fully close, i.e., perpendicular to the centerline. The blades 50 may be rotated by an actuator 52 disposed in the hub 40.

Referring to FIGS. 1 and 2, each of the blades 50 includes a crank 54 having a shaft 56 forming a pivot axis of the blade 50 and an arm 58 extending from the shaft 56 so that the arm 58 is offset from the pivot axis. Each of the arms 58 may include a first portion 59 that extends outwardly from the shaft 56 and a second portion 61 that extends from the first portion towards a center of the stator 28. The second portion 61 may be substantially parallel to the shaft 56 and offset from the pivot axis. The outer ring 48 may define a plurality of holes 70 and an outer rim 76 of the hub 40 may define slots 72. The holes 70 and slots 72 are circumferentially arranged around the stator 28 and radially aligned with each other. Each crank 54 is disposed in corresponding ones of the holes 70 and the slots 72 with a distal end 74 of the crank 54 received in the corresponding hole 70 and with the shaft 56 extending through the corresponding slot 72. The cranks 54 are rotatable within the holes 70 and slots 72 to modify the pitch angle of the blades 50.

Referring to FIGS. 1 and 3, the stator 28 includes a crank-locator ring 60 disposed within the hub 40 radially inboard of the outer rim 76. The locator ring 60 defines a plurality of seats 78 that are each configured to receive one of the second portions 61 of the cranks 54. The seats 78 may be defined by a plurality of raised portions 80 that are formed by lancing or other suitable manufacturing technique. The locator ring 60 secures the second portions 61 of the cranks 54 and ensures that the cranks 54 are uniformly actuated so that each of the blades 50 has a substantially same pitch angle.

Referring back to FIG. 1, the actuator 52 modifies the pitch angle of the blades 50 by axially moving the arms 58, which causes the shafts 56 to rotate. The actuator 52 may include a piston 62 that is axially movable to engage the cranks 54. The piston 62 may be an annular plate having an outer surface disposed against the outer rim 76 and an inner surface encircling the turbine shaft 34. In the illustrated embodiment, the piston 62 and the locator ring 60 sandwich the cranks 54 therebetween. A resilient member 66 is disposed between an abutment 64 of the hub 40 and a backside of the locator ring 60 to bias the locator ring 60 and the cranks 54 against the piston 62. The raised portions 80 may extend from a main surface of the locator ring 60 by a distance that exceeds a diameter of the second portion 61 so that faces of the raised portions 80 are disposed against the piston 62. This allows the cranks 54 to rotate without frictional resistance from the piston 62. The outer rim 76 and the abutment 64 may cooperate to define a cavity 82 within the hub 40, and the resilient member 66, the piston 62, the cranks 54, and the locator ring 60 may be disposed within the cavity 82. The hub 40 may define bleeder orifices (not shown) to dampen operation of the actuator 52.

The resilient member 66 may be a diaphragm spring, a wave spring, or the like. The resilient member 66 biases the piston 62, the locator ring 60, and the cranks 54 away from the abutment 64 to bias the blades 50 to the closed position. Axial movement of the piston 62 towards the abutment 64 rotates the blades 50 towards the open position. The piston 62 is driven by the turbine 26 according to suction forces within the hydrodynamic chamber 38. A thrust bearing 68 is disposed between the piston 62 and the turbine 26 to transmit axial forces between the turbine 26 and the piston 62 while allowing independent rotation between the turbine 26 and the piston 62.

During operation, suction within the hydrodynamic chamber 38 pulls the turbine 26 towards the impeller 24. The magnitude of the suction is dependent upon the speed of the impeller 24 and the speed ratio between the turbine 26 and the impeller 24 (i.e., turbine speed/impeller speed). The suction generally increases as the speed ratio increases. For example, at idle speed there may be less than 1000 Newtons (N) of suction force, but this may increase above 10,000 N by 3000 RPMs of the engine. The resilient member 66 is designed to resist axial movement of the turbine 26 up to a threshold force to maintain the stator blades 50 in the closed position for a first range of speed ratios. Once the threshold force is exceeded, the resilient member 66 compresses and the piston 62 actuates the blades 50 towards the open position. The resilient member 66 may have a variable spring rate giving the stator blades 50 usable intermediate positions that occur as the resilient member 66 is gradually compressed with increasing suction. Alternatively, the resilient member 66 may have a constant spring rate causing the blades to quickly transition between the open and closed positions essentially creating a two-position stator.

The above described design allows the torque converter 20 to be loose for a first range of speed ratios corresponding to suction that is less than the threshold spring force, and to be tight for a second range of speed ratios, which is higher than the first range, corresponding to a suction that is greater than the threshold spring force. By modifying the spring rate of the resilient member 66, the torque converter 20 can be calibrated to so that the speed ranges are optimal for different engines. For example, having a stronger resilient member that maintains a loose torque converter for a larger first range of speeds may be ideal for turbo-charged engines, whereas a weaker resilient member that reduces the first speed range may be ideal for engines that produce high low-end torque.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A torque converter comprising:
an impeller;
a turbine axially movable relative to the impeller; and
a stator including a hub and variable-pitch blades circumferentially arranged on the hub, wherein each of the blades are rotatable between first and second positions in response to axial movement of the turbine.

2. The torque converter of claim 1, wherein each of the blades is biased to the first position and the stator is configured such that movement of the turbine towards the impeller rotates each of the blades towards the second position.

3. The torque converter of claim 2, wherein the first position is a closed position and the second position is an open position.

4. The torque converter of claim 1, wherein the stator further includes a resilient member biasing the turbine away from the impeller.

5. The torque converter of claim 4, wherein the resilient member is a spring.

6. The torque converter of claim 1, wherein each of the blades includes a crank extending into the hub and having a portion radially offset from a pivot axis of the blade.

7. The torque converter of claim 6, wherein the stator further includes a crank-locator ring disposed in the hub and defining circumferentially arranged seats that receive the cranks.

8. The torque converter of claim 6, wherein the stator further includes a piston plate disposed between the turbine and the cranks and configured to transmit movement of the turbine into the portions of the cranks to rotate the blades.

9. The torque converter of claim 8, wherein the stator further includes a resilient member biasing the portions, the piston plate, and the turbine away from the impeller.

10. The torque converter of claim 9, wherein the resilient member is annular.

11. A torque converter comprising:
an impeller;
a turbine axially movable relative to the impeller; and
a stator including:
a hub,
variable-pitch blades circumferentially arranged on the hub and each having a crank rotatable to rotate the blade between first and second positions,
a piston plate disposed between the turbine and the cranks, and engageable with the cranks, and
a resilient member disposed in the hub and engaging the cranks to bias the blades to the first position, wherein the stator is configured such that each of the blades rotates towards the second position in response to the turbine exerting a force on the piston plate in excess of a spring force of the resilient member.

12. The torque converter of claim 11, wherein the first position has a pitch angle corresponding to a loose state of the torque converter and the second position has a pitch angle corresponding to a tight state of the torque converter.

13. The torque converter of claim 11, wherein the hub defines an annular cavity and a portion of the crank and the resilient member are disposed in the cavity.

14. The torque converter of claim 11, wherein the resilient member is a diaphragm spring.

15. The torque converter of claim 11, wherein each of the cranks has a shaft centered on a pivot axis of the blade and an arm extending from the shaft.

16. The torque converter of claim 11, wherein the stator further includes a locator ring disposed in the hub and defining circumferentially arranged seats that receive the cranks.

17. The torque converter of claim 16, wherein the hub defines an abutment and the resilient member acts between the abutment and the locator ring.

18. The torque converter of claim 11, wherein the resilient member biases the turbine away from the impeller.

19. A torque converter comprising:
an impeller;
a turbine axially movable relative to the impeller; and
a stator including variable-pitch blades, a piston engageable with the blades to modify a pitch angle of the blades, and a resilient member biasing each of the blades to a first position, wherein the stator is configured such that each of the blades moves towards a second position in response to the turbine exerting a threshold force on the piston.

20. The torque converter of claim 19, wherein the threshold force is based on a spring rate of the resilient member.

* * * * *